No. 750,372. PATENTED JAN. 26, 1904.
D. KENNEDY.
GRINDING MACHINE.
APPLICATION FILED JUNE 2, 1902.
NO MODEL. 2 SHEETS—SHEET 1.
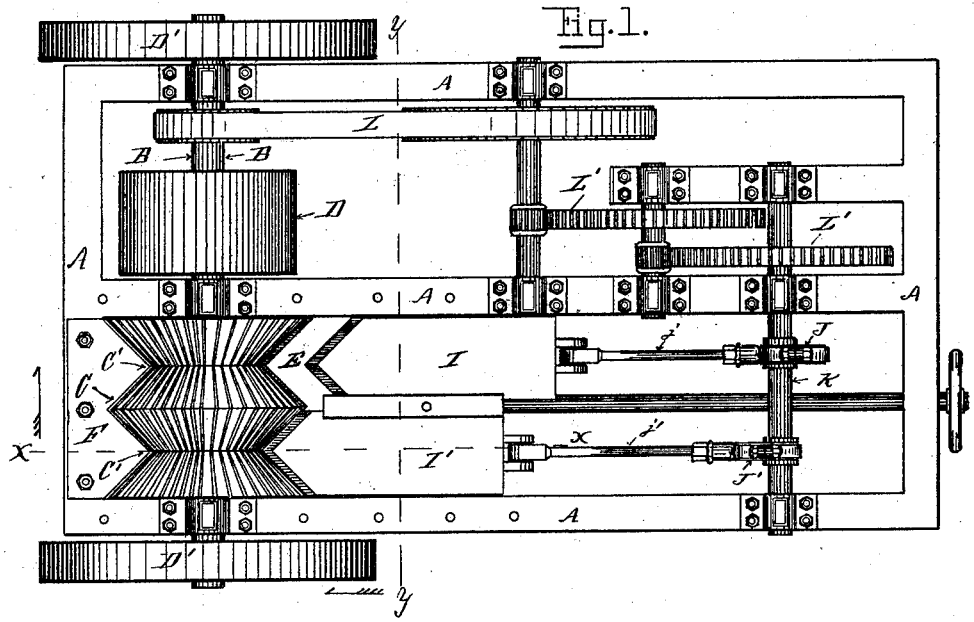
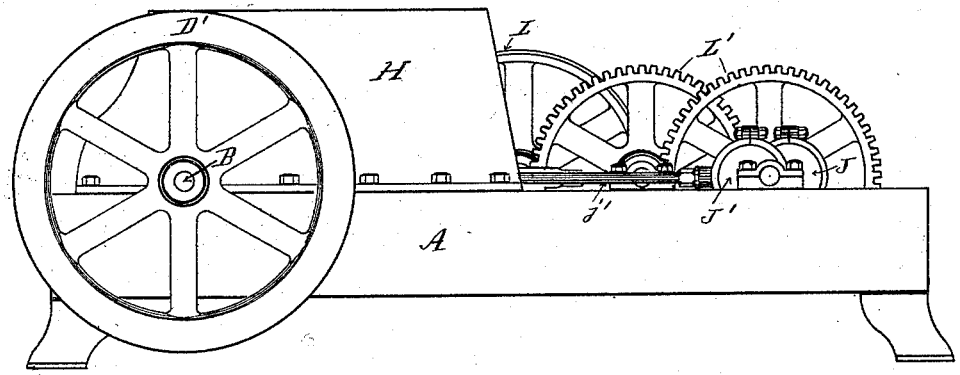
Witnesses.
H. M. Sturgeon.
F. J. Bassett.
Inventor.
David Kennedy
By J. H. Sturgeon
Atty.

No. 750,372. PATENTED JAN. 26, 1904.
D. KENNEDY.
GRINDING MACHINE.
APPLICATION FILED JUNE 2, 1902.
NO MODEL. 2 SHEETS—SHEET 2.

Witnesses.
H. M. Sturgeon
F. J. Bassett

Inventor.
David Kennedy
By J. C. Sturgeon
Atty

No. 750,372.  
Patented January 26, 1904.

UNITED STATES PATENT OFFICE.

DAVID KENNEDY, OF ERIE, PENNSYLVANIA.

GRINDING-MACHINE.

SPECIFICATION forming part of Letters Patent No. 750,372, dated January 26, 1904.

Application filed June 2, 1902. Serial No. 109,923. (No model.)

*To all whom it may concern:*

Be it known that I, DAVID KENNEDY, a citizen of the United States, residing at Erie, in the county of Erie and State of Pennsylvania, have invented certain new and useful Improvements in Grinding-Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in machines for grinding clay and other friable materials, and has for its objects the improvements of the feeding mechanism, so that an adequate supply of material is at all times in contact with the grinding-cylinder, and the improvements in the construction and arrangement of the grinding-jaw, so that it will yield to substances too hard to be ground. These and other features of my invention are hereinafter set forth and described, and illustrated in the accompanying drawings, in which—

Figure 3:
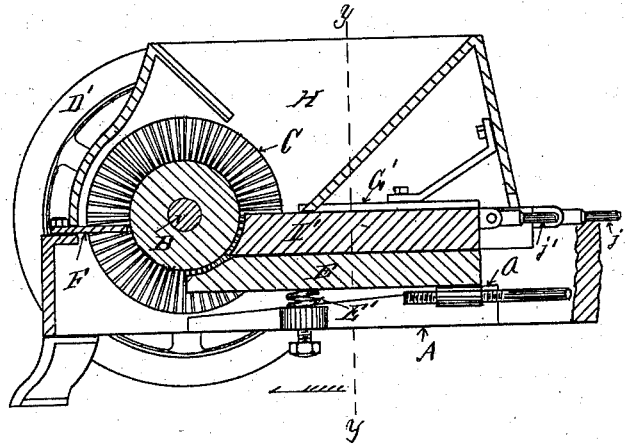
Figure 4:
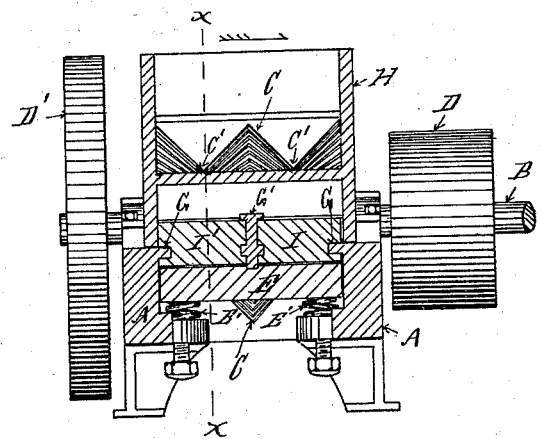

Figure 1 is a top or plan view of my improved grinding-machine with the hopper removed therefrom. Fig. 2 is a side elevation of my improved grinding-machine. Fig. 3 is a longitudinal section of one end of the machine on the line $x\ x$ in Figs. 1 and 4. Fig. 4 is a transverse section on the line $y\ y$ in Figs. 1 and 3.

In the drawings illustrating my invention, A is the frame of the machine. In the rear of this frame I mount a driving-shaft B, provided with a corrugated grinding-cylinder C, preferably made with V-shaped depressions C'. This shaft B is also provided with a driving-pulley D and preferably with balance-wheels D' D'.

In the frame A, adjacent to the grinding-cylinder C, I secure a longitudinally-adjustable grinding-jaw E, the rear end of which is supported upon guides $a$ on the frame and the front end upon strong springs E', so that in case a non-grindable substance passes down between the cylinder C and the jaw the front end of the jaw will move downward and allow it to pass without stopping the machine, after which the springs E' automatically return the jaw E to its normal position.

Upon the rear of the frame A, I secure an adjustable deflector F, which operates to prevent the finely-ground material passing between the cylinder and grinding-jaw from being carried around the rapidly-revolving grinding-cylinder C. On the top of the frame above the cylinder C and the grinding-jaw E, I secure to the frame A a hopper H, and in the frame A, above the grinding-jaw E, I mount on guides G G' G two reciprocating feeding-jaws I I', driven by cranks or eccentrics J J', on a shaft K and pitmen $j\ j'$, the cranks or eccentrics J J' being set upon the shaft K, so as to move the feeding-jaws I I' alternately forward and back toward and from the grinding-cylinder C, so that one or the other of the feeding-jaws is at all times forcing material into contact with the grinding-cylinder, so that the grinding-cylinder is constantly engaging the material being ground. The shaft K is driven from the main shaft B by means of ordinary belt and cog gearing L L', geared back to a speed suitable for reciprocating the feed-jaws I I'.

Having described my invention, so as to enable others to construct and operate the same, what I claim as new, and desire to secure by Letters Patent of the United States, is—

1. The combination in a grinding-machine, of a corrugated grinding-cylinder, a compound grinding-jaw consisting substantially of a vertically-adjustable lower jaw member, and two or more upper jaw members reciprocating alternately toward and from the grinding-cylinder, and mechanism for alternately moving said reciprocating jaw members, substantially as and for the purpose set forth.

2. The combination in a grinding-machine, of an annularly-grooved corrugated cylinder, a compound grinding-jaw consisting substantially of a longitudinally-adjustable lower jaw member provided with a yielding support under its jaw end, and two or more upper jaw members reciprocating alternately toward and away from the grinding-cylinder, and crank or eccentric mechanism for reciprocating said upper jaw members and moving them alternately toward and from the grinding-cylinder, so that one of them is constantly forcing the material being ground against the grinding-cylinder, substantially as set forth.

In testimony whereof I affix my signature in presence of two witnesses.

DAVID KENNEDY.

Witnesses:
H. M. STURGEON,
F. J. BASSETT.